United States Patent [19]

Hildebrand

[11] Patent Number: 4,892,957
[45] Date of Patent: Jan. 9, 1990

[54] PROCESS FOR THE PREPARATION OF A N-ALKYLATED BIPYRAZOLEANTHRONE

[75] Inventor: Rainer Hildebrand, Lörach, Fed. Rep. of Germany

[73] Assignee: Ciba-Geigy Corporation, Ardsley, N.Y.

[21] Appl. No.: 232,043

[22] Filed: Aug. 15, 1988

[30] Foreign Application Priority Data

Aug. 24, 1987 [CH] Switzerland ............... 3230/87

[51] Int. Cl.$^4$ ........................... C07D 231/54
[52] U.S. Cl. .................................... 548/357
[58] Field of Search ........................ 548/357

[56] References Cited

U.S. PATENT DOCUMENTS 1,329,435  2/1920  Singer et al. ............... 548/357

OTHER PUBLICATIONS

Havlickova et al., *Chemical Abstracts*, vol. 99, No. 38456K (1982).
Havlickova et al., *Chemical Abstracts*, vol. 98, No. 5440b, (1982).

*Primary Examiner*—Robert W. Ramsuer
*Attorney, Agent, or Firm*—Edward McC. Roberts

[57] ABSTRACT

A N-alkylated 2,2'-bipyrazoleanthrone of formula

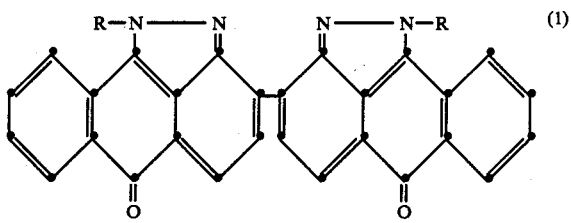

wherein R is $C_1$–$C_8$alkyl, is prepared by dimerising a 1,9-pyrazoleanthrone of formula

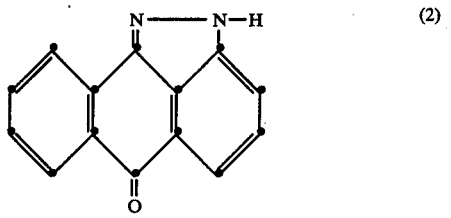

in the presence of an alkali metal hydroxide and an alkanol of 1 to 5 carbon atoms and at elevated temperature, and reacting the resultant intermediate of formula

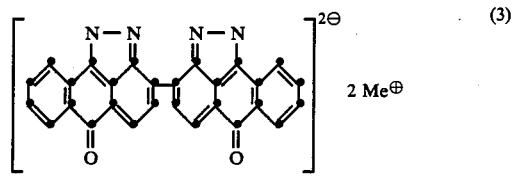

wherein Me is an alkali metal cation, with an alkyl halide which introduces the alkyl radical R, in the molar ratio 1:2, and in the presence of an alkylene glycol or a $C_1$–$C_4$alkyl ether thereof as catalyst. The N-aklylated bipyrazoleanthrone is suitable for use as a vat dye.

9 Claims, No Drawings

PROCESS FOR THE PREPARATION OF A N-ALKYLATED BIPYRAZOLEANTHRONE

The present invention relates to a process for the preparation of a N-alkylated 2,2'-bipyrazoleanthrone of formula

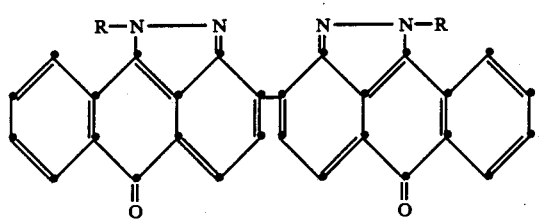

wherein R is $C_1$–$C_8$alkyl, which process comprises dimerising a 1,9-pyrazoleanthrone of formula

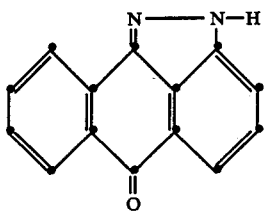

in the presence of an alkali metal hydroxide and an alkanol of 1 to 5 carbon atoms and at elevated temperature, and reacting the resultant intermediate of formula

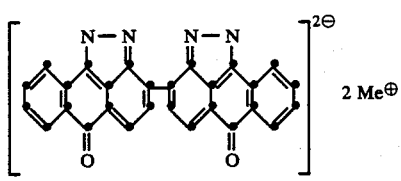

wherein Me is an alkali metal cation, with an alkyl halide which introduces the alkyl radical R, in the molar ratio 1:2, and in the presence of an alkylene glycol or a $C_1$–$C_4$alkyl ether thereof as catalyst.

R is preferably $C_1$–$C_5$alkyl, in particular methyl or, most preferably, ethyl.

The alkali metal hydroxide is, for example, potassium hydroxide, sodium hydroxide, or a mixture of potassium and sodium hydroxide.

The weight ratio of alkali metal hydroxide to the starting 1,9-pyrazoleanthrone is preferably from 5:1 to 0.9:1, most preferably from 3.5:1 to 2:1.

The alkanol is preferably an alcohol having a boiling point of <120° C. Particularly suitable alkanols are methanol, ethanol, n-propanol, isopropanol, n-butanol, 2-butanol, isobutanol, tert-butanol oder iso-pentanol. In some cases it is also possible to use n-pentanol.

It is especially preferred to use methanol, ethanol or isopropanol. Mixtures of these alkanols can also be used.

The process is carried out, for example, with one to four times the amount by weight of alkali metal hydroxide, based on the alkanol.

It is particularly advantageous to use a mixture of potassium hydroxide and ethanol, in which case a melt is obtained.

The reaction temperature for the dimerisation of the pyrazoleanthrone is influenced by the alkali melt obtained. The reaction temperature will preferably be in the range from 110° to 180° C., most preferably from 130° to 150° C. After the formation of the alkali melt, the reaction product is subjected to air oxidation, usually in the temperature range from 60° to 95° C., whereupon the 2,2'-bipyrazoleanthrone is obtained in the form of an alkali metal salt.

The subsequent alkylation is preferably effected without isolation of the intermediate. It is carried out with an alkyl halide, for example an alkyl iodide, bromide or chloride.

It is necessary to use the alkyl halide in an equivalent amount to introduce the two alkyl radicals R. A small excess of the alkyl halide over the molar amount of bipyrazoleanthrone is normally used. Unreacted alkyl halide can thereafter be removed by distillation or also hydrolysed to alkanol.

The alkylation can be carried out in the temperature range from 10° to 100° C., preferably from 10° to 80° C., or also at a temperature below the boiling temperature of the alkyl halide. The alkylation can also be carried out under pressure at elevated temperature in an autoclave, for example at up to 200° C. The reaction is frequently exothermic and can, if desired, be controlled by cooling.

Examples of suitable alkyl halides are methyl chloride, methyl bromide, ethyl chloride, ethyl bromide, propyl chloride, propyl bromide, 3-methyl-butyl bromide, butyl bromide or bromoctane. Ethyl bromide is preferred.

The alkylation is carried in the presence of a catalyst which is an alkylene glycol or a $C_1$–$C_4$monoalkyl ether thereof. Normally 0.5 to 10 percent by weight, preferably 1 to 5 percent by weight, of catalyst is used, based on the bipyrazoleanthrone.

Suitabale catalysts are, for example, ethylene glycol, propylene glycol, diethylene glycol, dipropylene glycol, polyethylene glycols, polypropylene glycols, ethylene glycol monomethyl ether, ethylene glycol monoethyl ether, ethylene glycol monobutyl ether, diethylene glycol monomethyl or monoethyl ether, and triethylene glycol monomethyl ether. Mixtures of these alkylene glycols can also be used. The preferred catalyst is polyethylene glycol having an average molecular weight of 300 to 1000 or 300 to 650, preferably 400 to 450.

Upon completion of the alkylation, the N-alkylated bipyrazoleanthrone is isolated in conventional manner, for example by filtering or decanting the resultant suspension and washing and drying the product.

If desired, the N-alkylated bipyrazoleanthrone is subjected to a purification process to remove unwanted isomeric compounds by solvent extraction. Suitble solvents for this procedure are ethyl acetate, acetone, methylene chloride, dimethyl acetamide, formic acid, amyl alcohol, preferably toluene, xylene, chlorobenzenes such as dichlorobenzene or trichlorobenzene or, most preferably, nitrobenzene.

The N-alkylated bipyrazoleanthrone obtained by the process of this invention is a vat dye for dyeing or printing fibres made from natural or regenerated cellulose in the presence of a reducing agent, for example dithionite.

The process of this invention makes it possible to prepare the N-alkylated bipyrazoleanthrones of formula (1), especially N-ethylated 2,2'-bipyrazoleanthrone, in particularly simple manner and in very good yield. The preparation of the bipyrazoleanthrone metal salt and subsequent reaction with an alkyl halide can be combined in a single step. It is thus possible to carry out the alkylation much more rapidly and more economically than, for example, with a dialkyl sulfate.

The novel process therefore makes possible a very substantial saving in effort and time, requires less energy and, in addition, provides a vat dye in very good yield and great purity. In the following Example, percentages are by weight.

EXAMPLES 275.5 g of potassium hydroxide and 76.6 g of ethanol are heated to 130° C. Then 74.9 g of 1,9-pyrazoleanthrone are added in portions over 30 minutes. The mixture is then stirred for 2½ hours at 140°–145° C. The reaction product is then cooled to 125° C. and 200 ml of water are added dropwise. During this addition, a mixture of ethanol and water are distilled off. The aqueous suspension is subsequently oxidised by blowing in air for 3 hours at 80° C. and then cooled to room temperature. The potassium salt of 2,2'-bipyrazoleanthrone is obtained in suspension. Without isolation of the intermediate, a mixture of 5 g of polyethylene glycol (mol. wt. 400) and 87.6 g of ethyl bromide are added. After 1 hour at 25° C., the reaction mixture is warmed to 33° C. and stirred for 15 hours until reaction is complete. The suspension is filtered and the filter residue is washed with 2 liters of water and dried under vacuum at 80° C.

The crude product is subjected to solvent extraction to give 62.7 g of an isomer-free dye of formula

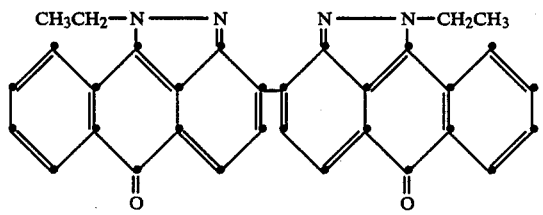

in a yield of 80%.

The alkylated bipyrazoleanthrones listed in the following Table are obtained in the indicated yields by repeating the procedure described in this Example and using the alkylating agents, catalysts and temperatures specified in the appropriate columns.

TABLE

| Ex. | Alkylating agent | Catalyst | Temp./°C. | Yield |
| --- | --- | --- | --- | --- |
| A | 60 ml of ethyl bromide | polyethylene glycol 300 | 33 | 66.5 g; 79% |
| B | 60 ml of ethyl bromide | ethylene glycol monoethyl ether | 33 | 65.2 g; 77% |
| C | 60 ml of ethyl bromide | polyethylene glycol methyl ether 750 | 33 | 64.1 g; 75% |
| D | 50 ml of methyl iodide | polyethylene glycol 400 | 34 | 52.4 g; 66% |
| E | 73 ml of n-propyl bromide | polyethylene glycol 400 | 65 | 68.0 g; 76% |
| F | 100 ml of 3-methyl-butyl bromide | polyethylene glycol 400 | 80 | 68.9 g; 70% |
| G | 60 ml of ethyl bromide | polyethylene glycol 1000 | 33 | 59.7 g; 71% |
| H | 140 ml of bromoctane | polyethylene glycol 400 | 100 | 65 g; 71% |

What is claimed is:

1. A process for the preparation of a N-alkylated 2,2'-bipyrazoleanthrone of formula

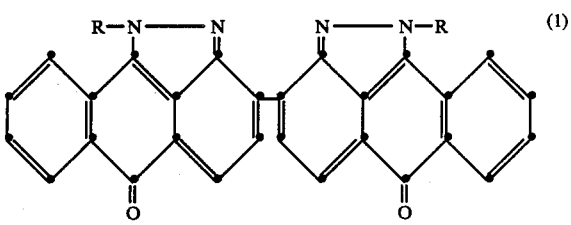

wherein R is $C_1$–$C_8$alkyl, which process comprises dimerising a 1,9-pyrazoleanthrone of formula

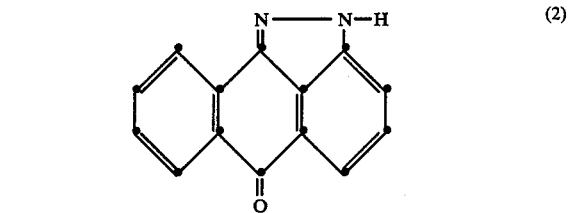

in the presence of an alkali metal hydroxide and an alkanol of 1 to 5 carbon atoms and at elevated temperature, and reacting the resultant intermediate of formula

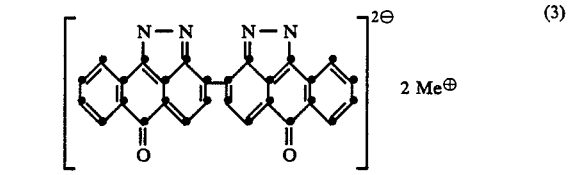

wherein Me is an alkali metal cation, with an alkyl halide which introduces the alkyl radical R, in the molar ratio 1:2, and in the presence of an alkylene glycol or a $C_1$–$C_4$alkyl ether thereof as catalyst.

2. A process according to claim 1, wherein R in formula (1) is methyl or ethyl.

3. A process according to claim 1, wherein a mixture of potassium hydroxide and ethanol is used.

4. A process according to claim 1, wherein the dimerisation is carried out in the temperature range from 110° to 180° C.

5. A process according to claim 1, wherein the alkylation is carried out without isolation of the intermediate.

6. A process according to claim 1, wherein the alkylation is carried out with an alkyl bromide.

7. The process of claim 6, wherein the alkyl bromide is ethyl bromide.

8. A process according to claim 1, wherein the reaction with the alkyl halide is carried out in the presence of polyethylene glycol.

9. The process of claim 8, wherein the polyethylene glycol has an average molecular weight of 300 to 1000.

* * * * *